United States Patent
Seong et al.

(10) Patent No.: US 10,228,820 B2
(45) Date of Patent: *Mar. 12, 2019

(54) DISPLAY APPARATUS AND DISPLAYING METHOD THEREOF

(71) Applicant: SAMSUNG ELECTRONICS CO., LTD., Suwon-si, Gyeonggi-do (KR)

(72) Inventors: Hye-young Seong, Suwon-si (KR); Bo-kyung Shim, Seoul (KR); Jong-chan Park, Seoul (KR); Jin-ho Yim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 11 days.

This patent is subject to a terminal disclaimer.

(21) Appl. No.: 14/615,027

(22) Filed: Feb. 5, 2015

(65) Prior Publication Data
US 2016/0231875 A1 Aug. 11, 2016
US 2019/0025990 A9 Jan. 24, 2019

Related U.S. Application Data

(63) Continuation of application No. 12/559,057, filed on Sep. 14, 2009, now Pat. No. 9,152,298.

(30) Foreign Application Priority Data

Dec. 8, 2008 (KR) .................. 10-2008-0124072

(51) Int. Cl.
*G06F 3/048* (2013.01)
*G06F 3/0482* (2013.01)
(Continued)

(52) U.S. Cl.
CPC .............. *G06F 3/0482* (2013.01); *G06F 8/61* (2013.01); *G06F 3/04817* (2013.01); *G06F 3/04842* (2013.01); *G06F 8/38* (2013.01)

(58) Field of Classification Search
None
See application file for complete search history.

(56) References Cited

U.S. PATENT DOCUMENTS 5,767,851 A * 6/1998 Yee ..................... G06F 3/0486
715/748
6,344,861 B1 2/2002 Naughton et al.
(Continued)

FOREIGN PATENT DOCUMENTS

KR 10-2008-0083192 A 9/2008
WO 2008/038004 A2 4/2008

OTHER PUBLICATIONS

Al McGuill III et al., Icon Color Match to Show State of Object Represented by Icon, Sep. 1, 1994, ip.com, vol. 37, n9, pp. 385-386 (Year: 1994).*

(Continued)

*Primary Examiner* — Tam T Tran
(74) *Attorney, Agent, or Firm* — Sughrue Mion, PLLC

(57) ABSTRACT

A display apparatus and a displaying method thereof are provided. A storage unit stores installed items, a UI generator generates a UI including a first area to display the installed items and a second area to display installable items, a display unit displays the generated UI, and, if one of the items displayed on the second area is selected, a controller displays a process of moving the selected item moved to the first area.

13 Claims, 8 Drawing Sheets

(51) Int. Cl.
*G06F 8/61* (2018.01)
*G06F 3/0481* (2013.01)
*G06F 3/0484* (2013.01)
*G06F 8/38* (2018.01)

(56) References Cited

U.S. PATENT DOCUMENTS

| | | | |
|---|---|---|---|
| 7,509,588 B2 | 3/2009 | Van Os et al. | |
| 2005/0071773 A1* | 3/2005 | Ivanovic | G06F 3/04817 715/768 |
| 2006/0146765 A1 | 7/2006 | Van De Sluis et al. | |
| 2006/0277469 A1* | 12/2006 | Chaudhri | G06F 3/04817 715/709 |
| 2007/0055918 A1* | 3/2007 | Snover | G06F 11/328 714/57 |
| 2007/0101297 A1* | 5/2007 | Forstall | G06F 3/04817 715/841 |
| 2007/0157089 A1 | 7/2007 | Van Os et al. | |
| 2007/0211159 A1 | 9/2007 | Hare et al. | |
| 2008/0165153 A1* | 7/2008 | Platzer | G06F 1/1626 345/173 |
| 2009/0138827 A1 | 5/2009 | Van Os et al. | |

OTHER PUBLICATIONS

Margaret Ross, Quality in Web Design for Visually Impaired Users, 2002, Software Quality Journal, Edition or vol. 10, pp. 285-298 (Year: 2002).*

Communication dated Sep. 9, 2015, issued by the Korean Intellectual Property Office in counterpart Korean Application No. 10-2015-0105742.

Communication dated Jan. 9, 2014 issued by the European Patent Office in counterpart European Application No. 09170683.8.

Communication dated Nov. 4, 2014 issued by the Korean Intellectual Property Office in counterpart Korean Patent Application No. 10-2008-0124072.

"WinCustomize: Explore : Progress Amins : Nemesis II" by Jalentorn, downloaded from http://www.wincustomize.com/explore/progress_anims/75/ on May 3, 2012.

"Progress Indicator—Ajax Patterns", archived Apr. 6, 2006, downloaded on May 3, 2012 from http://ajaxpatterns.org/wiki/index.php?title.Progress_Indicator&oldid=5622.

"Loading Screen—Television Tropes & Idioms", archived Mar. 24, 2009 by the Internet Wayback Machine, downloaded from https://web.archive.org/web/20090324035506/http://tytropes.org/pmwiki/pmwiki.php/Main/LoadingScreen.

"Dynamic Loading—Television Tropes & Idioms", archived Jun. 13, 2009 by the Internet Wayback Machine, downloaded from, https://web.archive.org/web/20090613015259/http://tytropes.org/pmwiki/pmwiki.php/Main/DynamicLoading.

Office Action received in parent U.S. Appl. No. 12/559,057 dated May 21, 2012.

Final Office Action received in parent U.S. Appl. No. 12/559,057 dated May 24, 2013.

Notice of Allowance received in parent U.S. Appl. No. 12/559,057 dated Sep. 25, 2014.

* cited by examiner

DISPLAY APPARATUS AND DISPLAYING METHOD THEREOF

CROSS-REFERENCE TO RELATED APPLICATIONS

This application is a continuation application of U.S. application Ser. No. 12/559,057, filed Sep. 14, 2009, which claims priority from Korean Patent Application No. 10-2008-0124072, filed on Dec. 8, 2008, in the Korean Intellectual Property Office, the disclosures of which are incorporated herein by reference in their entirety.

BACKGROUND OF THE INVENTION

Field of the Invention

Apparatuses and methods consistent with the present invention relate to a display apparatus and a displaying method thereof, and more particularly, to a display apparatus which shows a path until a selected item is installed therein and a displaying method thereof.

Description of the Related Art

A recent display apparatus provides a function of adding a new item desired by a user or deleting an existing item. For example, if a user selects a widget through a menu provided on the display apparatus, the display apparatus downloads the widget from an external network and installs it in an internal storage medium.

However, a conventional display apparatus does not show a process of downloading and installing an item selected on a menu in the display apparatus and shows only the menu.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

According to an aspect of the present invention, there is provided a display apparatus including a storage unit which stores installed items, a User Interface (UI) generator which generates a UI including a first area to display, at least, the installed items and a second area to display, at least, the installable items.

There is further included a display unit including a display area which displays the generated UI and a controller which, if at least one of the items displayed on the second area is selected, controls the UI generator and the display unit to display a process of moving the at least one selected item from the second area to the first area.

The UI generator may generate a motion graphic showing the process of moving the at least one selected item from the second area to the first area along a pre-set path.

The display apparatus may further include a user input unit which selects at least one of the displayed installable items and requests the at least one selected item to be installed in the storage unit.

The controller may control a moving speed of the motion graphic to correspond to a period of time necessary to install the at least one selected item in the storage unit. The controller may control the UI generator such that the at least one selected item is added to the first area and displayed on a pre-determined portion of the first area, and the pre-determined portion may be configurable by a user. The pre-determined portion of the first area may be a headmost position.

The first area may be positioned on a lower end part of a display area of the display unit and the second area may be positioned on an upper end part of the display area of the display unit. During the moving of the at least one selected item from the second area to the first area, the at least one selected item may move as if accelerating towards the first area by gravity.

The UI generator may process the at least one selected item such that, during the moving of the at least one selected item from the second area to the first area, the at least one selected item is displayed as if transparent or semitransparent with respect to the UI and the non-selected items.

The display apparatus may further include an interface which may receive the installable items through an external network. The installed items and the installable items may be stored in a web-server and the controller may control the interface and the UI generator to receive a list of the installed items and a list of installable items from the web-server and the external network and generate the UI.

The second area may also display installed items and the installed items therein may be visually identified as installed items.

A position of the first area in the display area of the display device may be configurable by the user.

According to another aspect of the present invention, there is provided a displaying method including generating a UI including a first area to display, at least, installed items and a second area to display, at least, installable items, displaying the generated UI, and, if at least one of the installable items displayed on the second area is selected, displaying a process of moving the at least one selected item from the second area to the first area.

The UI may generate a motion graphic showing the process of moving the at least one selected item from the second area to the first area along a pre-set path.

The displaying method may further include selecting at least one of the displayed installable items and requesting the at least one selected item to be installed.

A moving speed of the motion graphic may show the process of moving the at least one selected item from the second area to the first area, and the speed may correspond to a period of time necessary to install the at least one selected item.

Displaying the process of moving the at least one selected item from the second area to the first area may include displaying the at least one selected item moving to a pre-determined portion of the first area. The pre-determined portion of the first area is may be a headmost position.

A position of the pre-determined portion of the first area may be configurable by a user.

The first area may be positioned on a lower end part of a display area of the display unit and the second area may be positioned on an upper end part of a display area of the display unit. During the moving of the at least one selected item from the second area to the first area, the at least one selected item may move as if accelerating towards the first area by gravity.

During the moving of the at least one selected item from the second area to the first area, the at least one selected item may be displayed as if transparent or semitransparent with respect to the UI and the non-selected items.

The displaying method may further include receiving the installable items through an external network. The installed items and the installable items may be stored in a web-server, wherein the operation of displaying the UI receives a list of the installed items and a list of installable items from the web-server and the external network and generates the UI, and then displays the UI.

The second area may further display installed items, wherein the installed items are visually identified as installed items.

Additional and/or other aspects of the invention will be set forth in part in the description which follows and, in part, will be obvious from the description, or may be learned by practice of the invention.

BRIEF DESCRIPTION OF THE DRAWING FIGURES

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
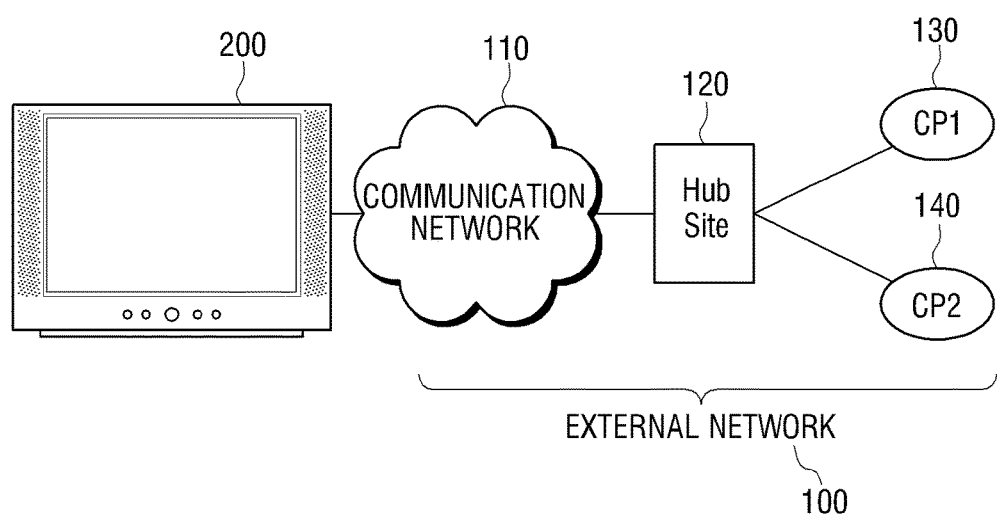
FIG. 1 is a view illustrating a system to which an exemplary embodiment of the present invention is applied.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a view illustrating a system to which a display apparatus according to an exemplary embodiment of the present invention is applied.

Referring to FIG. 1, a system comprises an external network 100 and a display apparatus 200. The external network 100 communicates with the display apparatus 200 in a wired or wireless manner and provides various items which can be installed in the display apparatus 200. The item includes a widget, an application, a service, and contents.

If the external network 100 provides a widget to the display apparatus 200, the external network 100 comprises a communication network 110, a hub site 120, and a plurality of contents providers (CP) 130, 140 (CP1, CP2). The number of CPs is not limited to two.

The hub site 120 is a server which is managed by the manufacturer of the display apparatus 200 to provide various data to users who purchased the products of the manufacturer. The CPs 130, 140 provides a widget to the hub site 120. Accordingly, the hub site 120 receives the widget from the CPs 130, 140 and transmits it to the display apparatus 200.

The display apparatus 200 provides a function of communicating with the external network 100 and may be an internet protocol television (IPTV) providing an interactive service, for example. Accordingly, the display apparatus 200 can provide an additional function such as a web-surfing and a widget besides the general TV function.

The user downloads an item from the external network 100 and installs it in the display apparatus 200, and stores and registers the installed item. Also, the user can add an item as he/she wishes to install and delete an item which is already installed.

Figure 2:
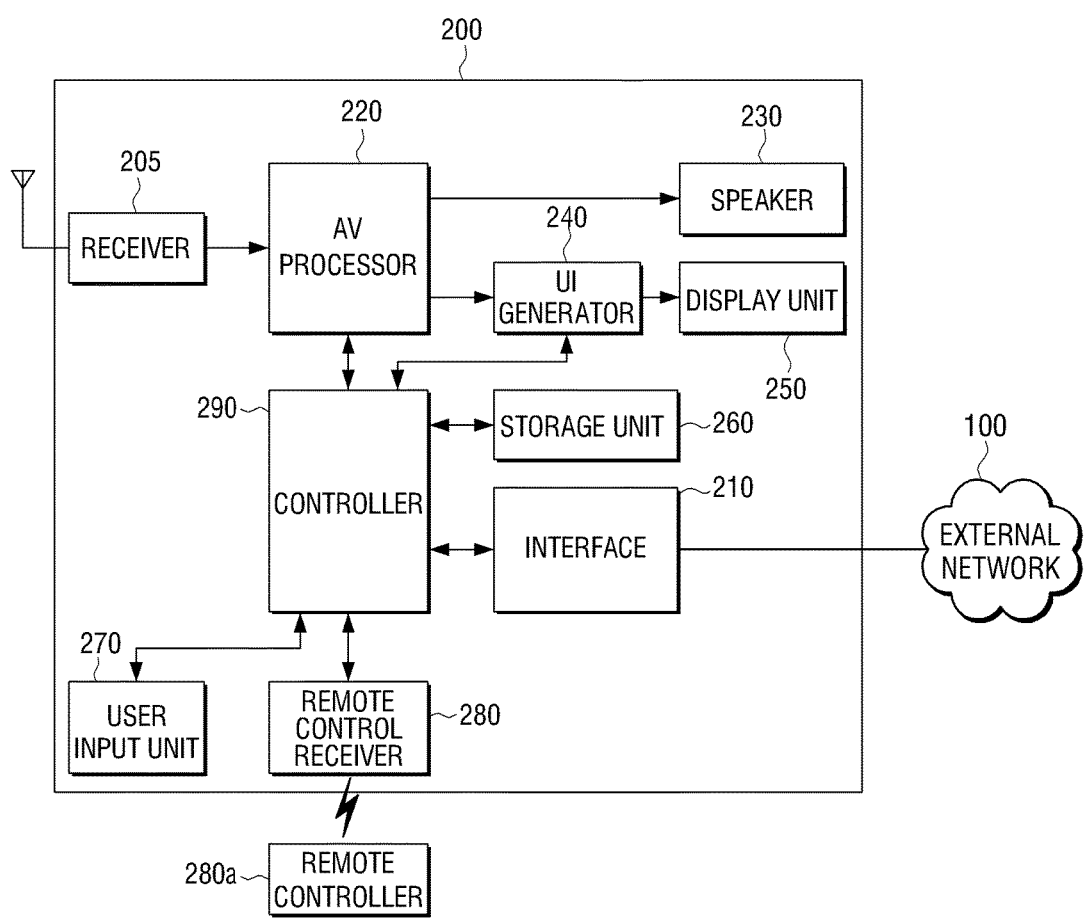
FIG. 2 is a block diagram illustrating an exemplary embodiment of the present invention.

As shown in FIG. 2, the display apparatus 200 comprises a receiver 205, an interface 210, an audio/video (AV) processor 220, a speaker 230, a user interface (UI) generator 240, a display unit 250, a storage unit 260, a user input unit 270, a remote control receiver 280, and a controller 290.

The receiver 205 receives a broadcast signal from a broadcasting station or satellite in a wire or wireless manner and tunes to the broadcast signal. The broadcast signal may include data including news information, weather information and stock information.

The interface 210 provides a wire or wireless communication interface with the external network 100 and may use a network interface card. If the user requests a widget to be downloaded, the interface 210 receives the widget through the CP1 130, the hub site 120, and the communication network 110. The external network 100 may be the internet.

The AV processor 220 performs signal-processing, such as video decoding, video scaling, and audio decoding, with respect to an AV signal input from the receiver 205 or a moving picture received through the interface 210. Also, the AV processor 220 outputs the video signal to the UI generator 240 and outputs the audio signal to the speaker 230.

If the received AV signal is stored to the storage unit 260, the AV processor 220 outputs the AV signal in the compressed format to the storage unit 260.

The UI generator 240 generates various UIs to provide them to the user. The UI generator 240 adds the generated UI to the video signal input from the AV processor 220 and outputs the UI to the display unit 250. The UI generated by the UI generator 240 may include a UI showing items which are already installed and items which can be installed, and a UI showing a process of installing a selected item, as shown in FIGS. 3A to 3D.

FIGS. 3A to 3D are views illustrating an example showing a path along which an item is installed in the display apparatus.

If a user requests an item to be installed by manipulating the user input unit 270, the interface 210 receives a list of installable items from the external network 100. The UI generator 240 generates a UI showing the received list of installable items and a list of items which are already installed as shown in FIG. 3A.

Figure 3A:
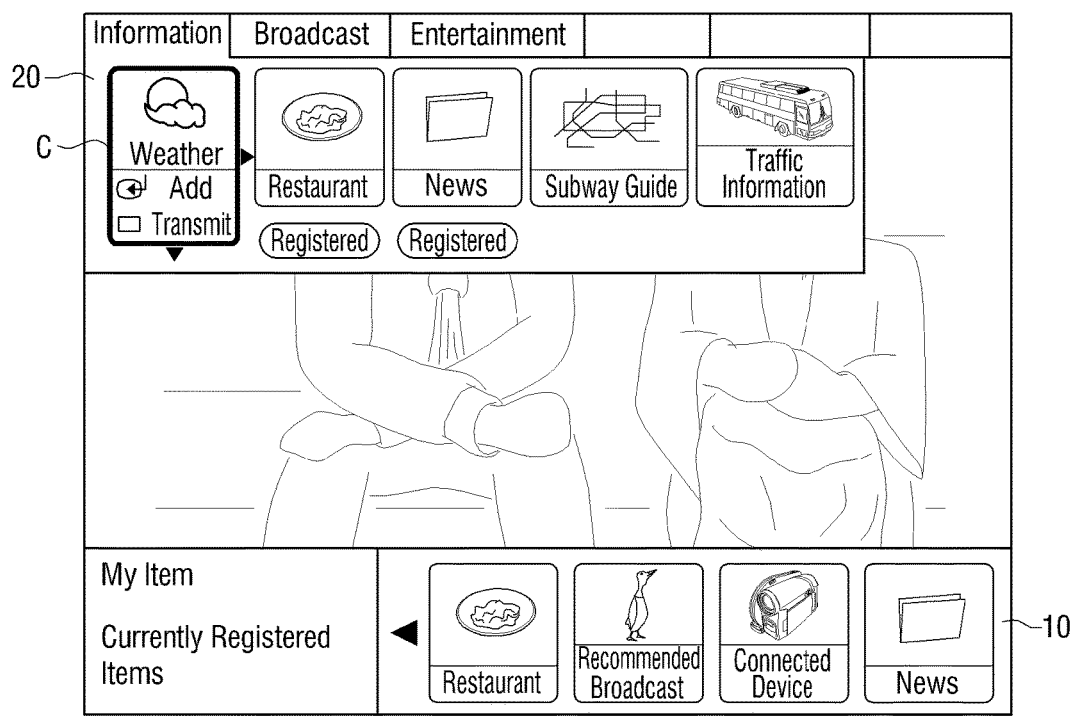
FIGS. 3A to 3D are views illustrating an aspect of an exemplary embodiment of the present invention, in which a path of an item is displayed until the item is installed.

Referring to FIG. 3A, the UI includes a first area 10 to display items which are already installed or registered in the display apparatus 200 and a second area 20 to display installable items received from the external network 100. That is, the first area 10 is a destination to which a selected item is added and the second area 20 is a source from which installable items are provided.

Figure 3B:
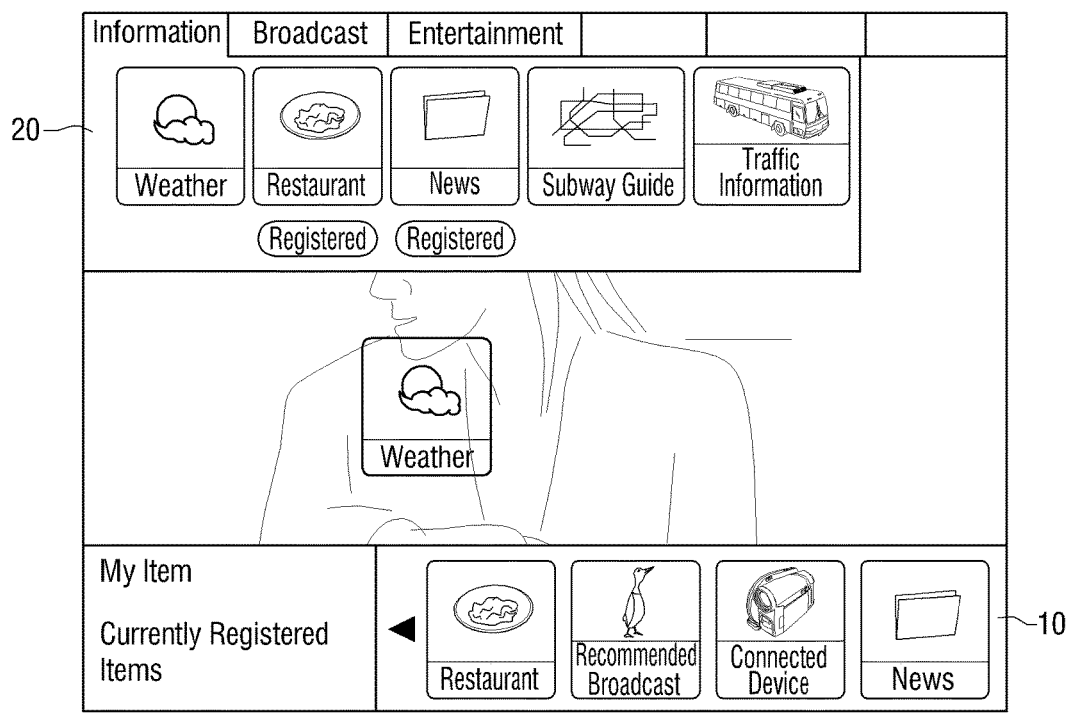
Figure 3C:
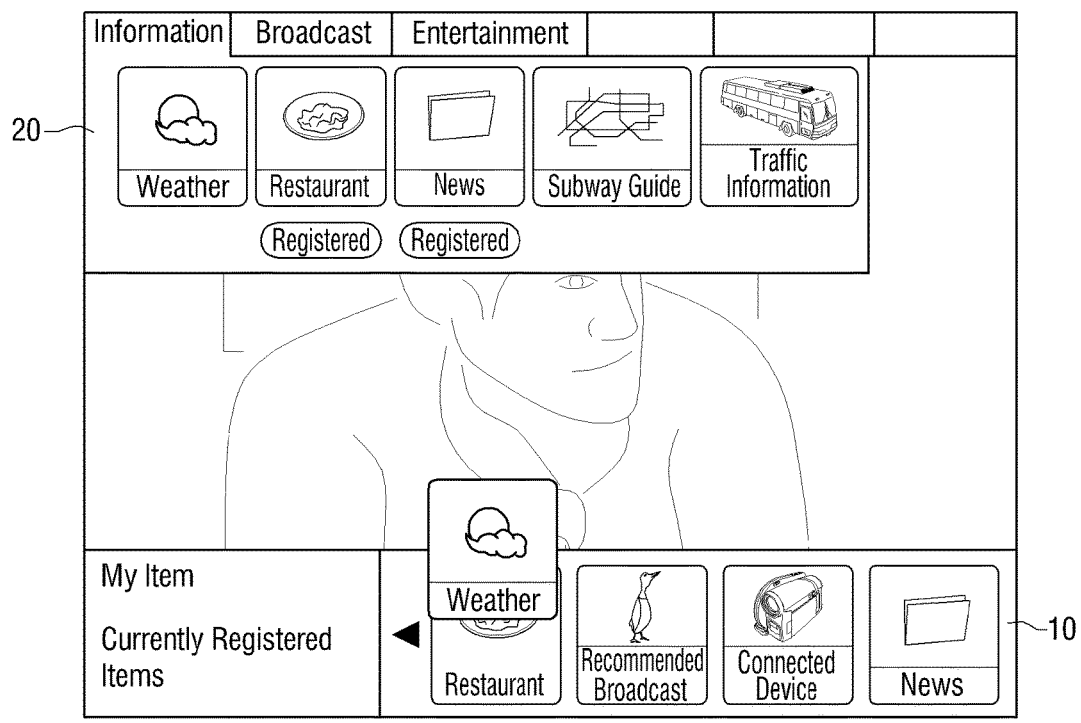
Figure 3D:
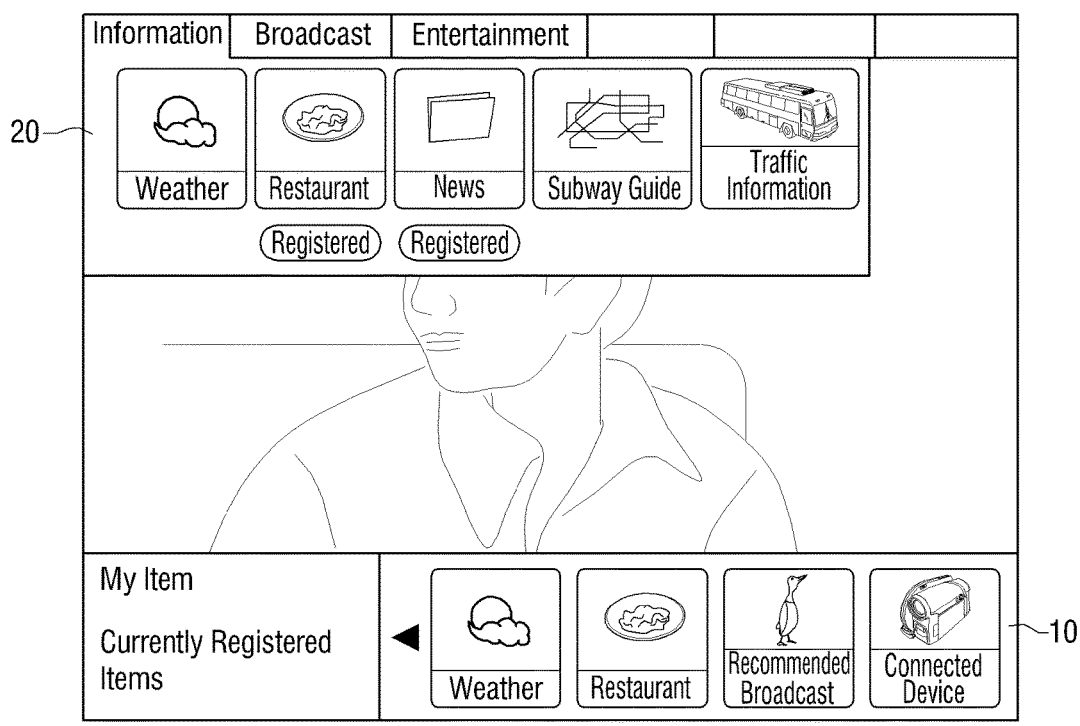

The user selects an item to install by manipulating a direction key on the user input unit 270 and moving the cursor C on the second area 20. In FIG. 3A, the cursor C is placed on a 'weather' widget. If the user selects the 'weather' widget to add it, the UI generator 240 generates a UI showing a process of moving the selected 'weather' widget to the first area 10 as shown in FIGS. 3B to 3D. That is, the UI generator 240 generates a motion graphic showing that the selected item, i.e., the 'weather' widget, is being moved to the first area 10 along a pre-set path to display the process. It may be an image of the 'weather' widget that is moved to the first area 10.

The path along which the selected item is moved is programmed to be pre-set and a plurality of paths may be set.

Also, the user may set a moving path until a selected item is installed in the display apparatus 200 and is shown in the first area 10. Setting the moving path will be described in detail hereinafter. The interface 210 receives information of items which can be installed in the display apparatus 200, for example, images or names of the items, from the external network 100 such an internet, and the UI generator 240 generates a UI including an area to display installable items and an area to display items which are already installed in the display apparatus 200.

The controller 290 determines a position of the area where the installed items are displayed to install and display a selected item, sets a moving path of the selected item from a position where the item is selected to a position where the selected item is installed and displayed, and moves the selected item along the set moving path and displays the item on the determined position.

Also, if the user requests a moving path setting screen to be displayed, the UI generator 240 generates a moving path setting screen showing various moving paths. The option for the moving path includes vertical movement, vertical movement after horizontal movement, oblique movement or curved movement.

The moving speed of the selected item, that is, the moving speed of the motion graphic may be set to correspond to the time necessary to add and install the selected item to the first area 10. For example, the UI generator 240 is controlled by the controller 290 to generate a UI in which the speed at which the item selected from the second area 20 is moved and added to the first area 10 is in proportion to the time necessary to install the selected item in the display apparatus 200.

If it takes a long time to install the selected item in the first area 10, the controller 290 may control the UI generator 240 to generate a motion graphic having a longer path. That is, the controller 290 may automatically select a moving path as well as the moving speed of the selected item by taking into consideration the time necessary to install the item.

The controller 290 may control the UI generator 240 to select a longer path and generate a motion graphic moving along the selected path.

The selected item may be displayed by the UI generator 240 in a manner that it is moved to the first area 10 as if it accelerates and drops down to the bottom by the gravity, and may be displayed as a semitransparent or transparent motion graphic. The transparency of the selected item may be controlled by the user through a menu.

Figure 4:
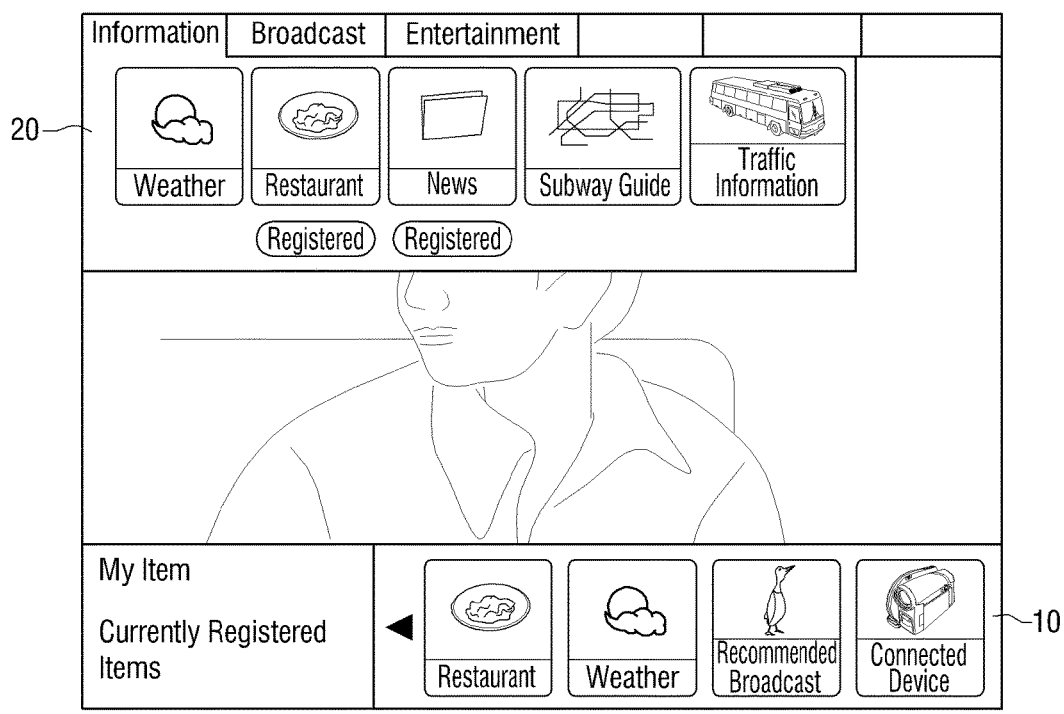
FIG. 4 is a view illustrating an aspect of an exemplary embodiment of the present invention, in which a position of an added item is changed.

The selected item is added to the headmost portion of the first area 10, which is a default value, as shown in FIG. 3D. The user may change the default value by manipulating the direction key of the user input unit 270, and may change the position of the item added to the first area 10. FIG. 4 illustrates an example in which the position of the added item is changed. Referring to FIG. 4, the added item of FIG. 3D is positioned next to the 'restaurant' widget.

Also, the user may change and set a default position on the first area in which the selected item is installed using the user input unit 270.

The display unit 250 displays the UI input from the UI generator 240, for example, the UI shown in FIGS. 3A to 3D and FIG. 4, or an image. The display unit 250 may be realized as various display elements such as a liquid crystal display (LCD) panel and a plasma display panel (PDP).

The storage unit 260 stores AV signals, moving pictures, installed items, and identification information of the installed items, which are received through the receiver 205 or the interface 210. The identification information of the installed items includes a category and an image of an item. The image of the item may be a thumbnail or an icon.

The storage unit 260 stores a program for executing the stored item. For example, if the item is a widget, the storage unit 260 stores a widget application. The UI generator 240 generates a corresponding widget using the widget application. The storage unit 260 may be realized as a hard disk or a non-volatile memory.

The user input unit 270, which serves as an interface to receive a command from the user and transmit it to the controller 290, may include a touch panel or various buttons, such as a plurality of number keys, a direction key, and a function key. The user selects an item to install in the display apparatus 200 by manipulating the user input unit 270 and controls a position in which to display the installed item.

The remote control receiver 280 receives user manipulation from a remote controller 280a and transmits the user manipulation to the controller 290. The remote controller 280a is operated in a way similar to the user input unit 270.

The controller 290 controls entire operation of the display apparatus 200 based on the user command transmitted from the user input unit 270 or the remote controller 280a. Various programs necessary for the control of the display apparatus 200 are stored to the storage unit 260. Also, the controller 290 displays an image according to the user command on the display unit 250. The image according to the user command includes the image described above with reference to FIGS. 3A to 3D and FIG. 4.

If a request to install an item is input from the user input unit 270, the controller 290 controls the UI generator 240 and the display unit 250 to generate and display the UI shown in FIG. 3A. If one of installable items displayed on the second area 20 of the UI is selected through the user input unit 270, the controller 290 controls the UI generator 240 to show the process of moving the selected item to the first area 10 with a motion graphic.

The controller 290 controls the speed at which the selected item is moved to the first area 10 to correspond to the time necessary to download and install the selected item in the display apparatus 200. Accordingly, the motion graphic of the selected item shows the progress status of the selected item being moved to the first area 10.

Figure 5:
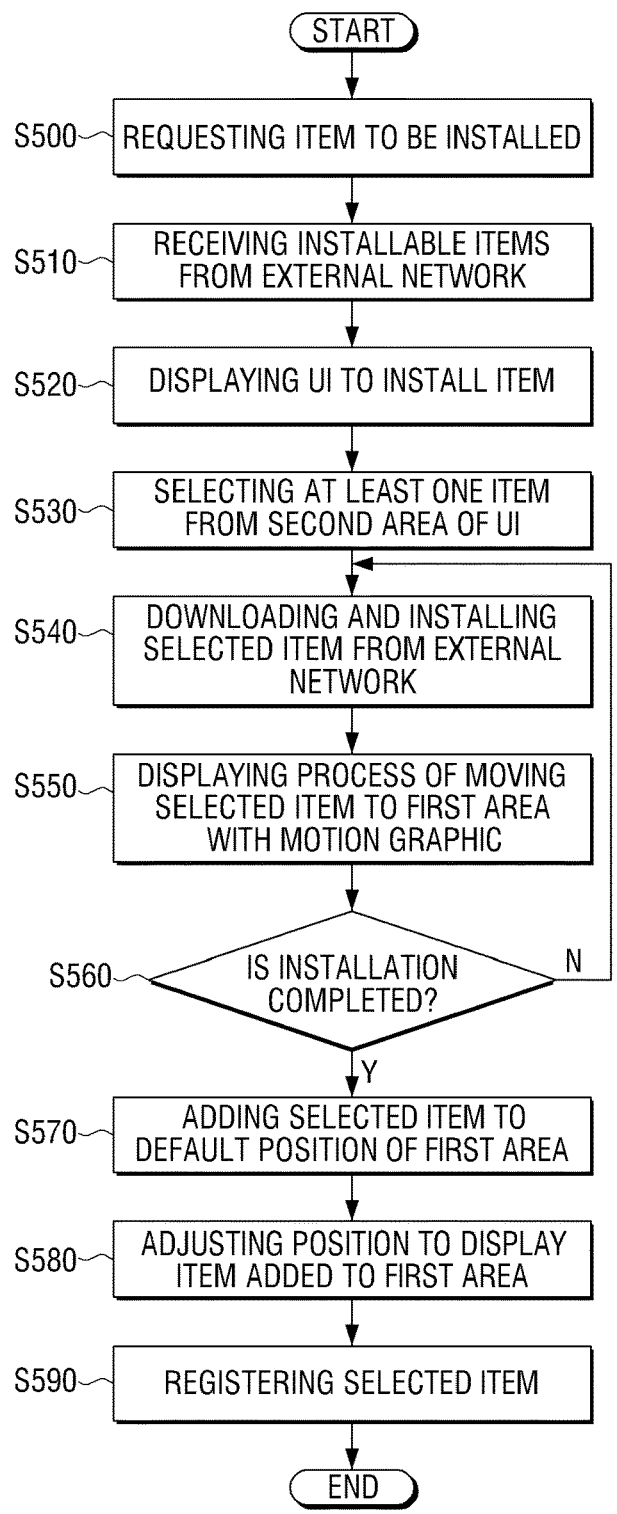
FIG. 5 is a flowchart illustrating a displaying method of consistent with an exemplary embodiment of the present invention.

FIG. 5 is a flowchart illustrating a displaying method of a display apparatus according to an exemplary embodiment of the present invention.

Referring to FIG. 5, if a command to install an item is input from the user input unit 270 (S500), the controller 290 controls the interface 210 to receive items which are installable in the display apparatus 200 from the external network 100 (S510).

The controller 290 controls the UI generator 240 and the display unit 250 to generate a UI shown in FIG. 3A using the installable items received in operation S510 and items stored in the storage unit 260 (S520) and display the UI.

If the user selects at least one item from the items on the second area 20 by manipulating the use input unit 270 (S530), the controller 290 downloads a program of the selected item from the external network 100 through the interface 210 and installs the program in the display apparatus (S540).

The controller 290 controls the UI generator 240 and the display unit 250 to display the process of moving the selected item from the second area 20 to the first area 10 on the UI (S550). Accordingly, the UI generator 240 generates a motion graphic showing that the selected item is being moved to the first area 10 along a pre-set path as shown in FIGS. 3B to 3D.

The item selected in operation S530 may move to the first area 10 as if it accelerates and drops down to the bottom by the gravity, and also, the moving speed of the selected item may be controlled to correspond to the time necessary to install the selected item in the display apparatus 200.

If downloading and installing the item is completed (S560), the UI generator 240 generates a UI in which the selected item is added to a default position of the first area 10 as shown in FIG. 3D (S570). The selected item is added to the first area 10 at the same time of completing installation of the item or two operations may be performed with a minute time difference.

If the user adjusts the position to display the added item by manipulating the user input unit 270 (S580) and presses an OK button (not shown) of the user input unit 270, the item selected in operation S530 is registered (S590).

In the above embodiment, the items are installed and added in the display apparatus 200. However, items may be installed in a web-hard or a web-server. That is, the web-hard or the web-server stores and maintains the items selected by the user. The web-hard or the web-server is provided in another server of the hub-site 120 or the external network 100.

If the user requests an item to be additionally installed, the controller 290 controls the interface 210 to receive a list of items already installed in the web-hard or the web-server and a list of installable items through the external network 100. Also, the controller 290 generates a UI as shown in FIGS. 3A to 3D using the received lists and shows the process and the moving path in which a selected item is added using a motion graphic as described above.

According to the exemplary embodiment of the present invention described above, if an item is selected through a menu, a process and a progress in which the selected item is installed in the display apparatus 200 are shown using the motion graphic of the item. That is, a visual feedback for the movement of the item is reinforced so that a process of adding the item can be intuitively shown to the user. Particularly, the selected item moves along a moving path set on the menu and also moves taking into consideration an installing time, so that the user can easily understand the installing progress of the item.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A display apparatus, comprising:
   a display;
   a transceiver configured to communicate with an external apparatus;
   a memory configured to store at least one program including instructions; and
   a processor configured to execute the instructions stored in the memory to:
   display a first user interface (UI) comprising an application list including an application program icon corresponding to an application program which is installable, and
   in response to a user input for installing the application program corresponding to the application program icon in the application list being received, receive data via the transceiver from the external apparatus to install the application program corresponding to the application program icon,
   wherein while the application program is installed according to the user input, the processor is further configured to display, in a second UI, the application program icon with a predetermined graphic effect on the application program icon to indicate that the application program corresponding to the application program icon is being installed, the predetermined graphic effect representing an installation progress status, and, in response to the installation of the application program being completed, stop providing the predetermined graphic effect to the application program icon.

2. The display apparatus of claim 1, wherein the processor is further configured to provide a transparency effect to the application program icon while the application program corresponding to the application program icon is installed, and in response to the installation of the application program being completed, stop providing the transparency effect to the application program icon.

3. The display apparatus of claim 1, wherein, in response to the installation of the application program being completed, the processor is further configured to add the application program icon as an installed program icon to the application list.

4. The display apparatus of claim 1, wherein the processor is further configured to control the display to display a last installed program icon on a predetermined portion of the application list.

5. The display apparatus of claim 4, wherein the predetermined portion is a headmost position.

6. The display apparatus of claim 1, wherein the predetermined graphic effect is a motion graphic effect of which a motion speed corresponds to the installation progress status of the application program.

7. A method of controlling a display apparatus, the method comprising:
   displaying a first user interface (UI) comprising an application list including an application program icon corresponding to an application program which is installable;
   in response to a user input for installing the application program corresponding to the application program icon in the application list being received, receiving data via a transceiver from an external apparatus to install the application program corresponding to the application program icon;
   while the application program is installed according to the user input, displaying, in a second UI, the application program icon with a predetermined graphic effect on the application program icon to indicate that the application program corresponding to the application program icon is being installed, the predetermined graphic effect representing an installation progress status; and in response to the installation of the application program being completed, stopping providing the predetermined graphic effect to the application program icon.

8. The method of claim 7, wherein the displaying the application program icon with the predetermined graphic effect comprises providing a transparency effect to the application program icon.

9. The method of claim 7, further comprising:

in response to the installation of the application program being completed, adding the application program icon as an installed program icon to the application list.

10. The method of claim 7, wherein the displaying the application list comprises displaying a last installed program icon on a predetermined portion of the application list.

11. The method of claim 10, wherein the predetermined portion is a headmost position.

12. The method of claim 7, wherein the predetermined graphic effect is a motion graphic effect of which a motion speed corresponds to the installation progress status of the application program.

13. A non-transitory computer-readable storage medium configured to store one or more computer programs including instructions that, when executed by processor, cause the processor to perform a method of controlling a display apparatus, the method comprising:

displaying a first user interface (UI) comprising an application list including an application program icon corresponding to an application program which is installable;

in response to a user input for installing an application corresponding to the application program icon in the application list being received, receiving data via a transceiver from an external apparatus to install the application program corresponding to the application program icon;

while the application program is installed according to the user input, displaying, in a second UI, the application program icon with a predetermined graphic effect on the application program icon to indicate that the application program corresponding to the application program icon is being installed, the predetermined graphic effect representing an installation progress status; and in response to the installation of the application program being completed, stopping providing the predetermined graphic effect to the application program icon.

* * * * *